United States Patent
Kneib et al.

(10) Patent No.: US 11,996,954 B2
(45) Date of Patent: May 28, 2024

(54) METHOD AND DEVICE FOR EVALUATING A SIGNAL (71) Applicant: Robert Bosch GmbH, Stuttgart (DE)

(72) Inventors: Marcel Kneib, Ingelheim (DE); Oleg Schell, Krautheim (DE)

(73) Assignee: ROBERT BOSCH GMBH, Stuttgart (DE)

(*) Notice: Subject to any disclaimer, the term of this patent is extended or adjusted under 35 U.S.C. 154(b) by 20 days.

(21) Appl. No.: 17/658,306

(22) Filed: Apr. 7, 2022

(65) Prior Publication Data
US 2022/0329456 A1 Oct. 13, 2022

(30) Foreign Application Priority Data
Apr. 13, 2021 (DE) ............ 10 2021 109 132.2

(51) Int. Cl.
*G06F 21/75* (2013.01)
*G06F 13/40* (2006.01)
*G06F 21/85* (2013.01)
*H04L 12/40* (2006.01)

(52) U.S. Cl.
CPC ...... *H04L 12/4013* (2013.01); *G06F 13/4068* (2013.01)

(58) Field of Classification Search
CPC .................................................. H04L 63/1416
See application file for complete search history.

(56) References Cited

U.S. PATENT DOCUMENTS

| 10,142,358 | B1* | 11/2018 | Bajpai | ............ H04L 1/201 |
| 2018/0270196 | A1* | 9/2018 | Bathurst | ......... H04L 12/40032 |
| 2022/0303287 | A1* | 9/2022 | Sloan | ............... H04L 12/40169 |

* cited by examiner

*Primary Examiner* — Idriss N Alrobaye
*Assistant Examiner* — Ronald T Modo
(74) *Attorney, Agent, or Firm* — NORTON ROSE FULBRIGHT US LLP; Gerard A. Messina (57) ABSTRACT A method for evaluating a signal that is, for example, transferred and/or receivable via a bus system. The method includes: ascertaining a first variable that characterizes a length of a bit sequence associated with the signal, for example, the bit sequence including n bits, where n is greater than or equal to one, and optionally ascertaining a second variable that characterizes a deviation of the length of the bit sequence from a reference bit sequence that includes n bits.

10 Claims, 10 Drawing Sheets

METHOD AND DEVICE FOR EVALUATING A SIGNAL

CROSS REFERENCE

The present application claims the benefit under 35 U.S.C. § 119 of German Patent Application No. DE 10 2021 109 132.2 filed on Apr. 13, 2021, which is expressly incorporated herein by reference in its entirety.

BACKGROUND INFORMATION

The present invention relates to a method for evaluating a signal that in particular is transferred and/or receivable via a bus system.

Moreover, the present invention relates to a device for evaluating a signal that in particular is transferred and/or receivable via a bus system.

SUMMARY

Exemplary specific embodiments of the present invention relate to a method, for example a computer-implemented method, for evaluating a signal that is, for example, transferred and/or receivable via a bus system, including: ascertaining a first variable that characterizes a length of a bit sequence associated with the signal, for example, the bit sequence including n bits, where n is greater than or equal to one, and optionally ascertaining a second variable that characterizes a deviation of the length of the bit sequence from a reference bit sequence that includes n bits.

In further exemplary specific embodiments of the present invention, the bit sequence is part of the signal or corresponds to the signal. For example, the bit sequence may correspond to n bits, the signal or the bit sequence having a length that is characterizable, for example, by a time (duration) that is longer (or optionally shorter) than an n-multiple of the bit duration of the bus system.

In further exemplary specific embodiments of the present invention, it is provided that the reference bit sequence is a rectangular-pulse signal.

In further exemplary specific embodiments of the present invention, it is provided that the method includes: ascertaining a first piece of information that characterizes a sender of the bit sequence, for example a fingerprint characterizing the sender, for example it being possible to carry out the ascertaining of the first piece of information characterizing the sender of the bit sequence, based on the first variable and/or based on the second variable and/or based on the first variable and the second variable.

In further exemplary specific embodiments of the present invention, by way of example the following procedure is accordingly provided: ascertaining a first variable that characterizes a length of a bit sequence associated with the signal, for example, the bit sequence including n bits, where n is greater than or equal to one, and ascertaining a first piece of information that characterizes a sender of the bit sequence, for example a fingerprint characterizing the sender, for example based on the first variable, for example not based on the second variable. In other words, ascertaining the second variable is not provided in some exemplary specific embodiments.

In further exemplary specific embodiments of the present invention, it is provided that the method includes at least one of the following elements: a) ascertaining a first time period between a rising edge and a falling edge of the bit sequence, b) ascertaining a second time period between a first rising edge and a second rising edge of the bit sequence, c) ascertaining a third time period between a falling edge and a rising edge of the bit sequence, d) ascertaining a fourth time period between a first falling edge and a second falling edge of the bit sequence, for example the bit sequence including one or multiple identical or different symbols, for example within the particular time period.

In further exemplary specific embodiments of the present invention, the first time period and/or the second time period and/or the third time period and/or the fourth time period may be regarded as an example of the first variable according to some exemplary specific embodiments.

In further exemplary specific embodiments of the present invention, it is provided that the method includes: ascertaining the first piece of information characterizing the sender of the bit sequence (a fingerprint, for example), based on at least one of the following elements: a) first time period, b) second time period, c) third time period, d) fourth time period.

In further exemplary specific embodiments of the present invention, it is provided that the bit sequence contains data that have been ascertainable or ascertained or received outside an arbitration phase of the signal, for example for a CAN bus system. In further exemplary specific embodiments of the present invention, the bit sequence is accordingly ascertained while no arbitration is taking place, for example on the bus system.

In further exemplary specific embodiments of the present invention, it is provided that the bit sequence contains data of a transfer in which only one sender sends, for example occupies the communication medium.

In further exemplary specific embodiments of the present invention, it is provided that the method includes: using a measuring device for ascertaining the first variable and/or at least one of the following elements: a) first time period, b) second time period, c) third time period, d) fourth time period, the measuring device including at least one of the following elements, for example: A) a time-to-digital converter (TDC), B) a hardware circuit, C) an application-specific integrated circuit (ASIC), D) an analog-to-digital converter.

In further exemplary specific embodiments of the present invention, it is provided that the method includes: a) providing at least one operating variable of the bus system, for example for a or the measuring device, for example for ascertaining the first variable, the at least one operating variable of the bus system including, for example: an electrical potential or an electrical voltage of at least one bus line, b) providing at least one signal that is derived from at least one operating variable of the bus system, for example for a or the measuring device, c) providing at least one start signal and/or at least one stop signal, for example for a or the measuring device.

In further exemplary specific embodiments of the present invention, it is provided that the method includes: providing at least one first threshold value, for example for ascertaining the first variable (or the time period), for example, and optionally changing the at least one first threshold value, it being possible for the changing to take place, for example, dynamically, for example while carrying out the method, for example during operation of a device that is provided for carrying out the method.

In further exemplary specific embodiments of the present invention, it is provided that the method includes: using multiple, for example different, bit sequences, for example for at least one of the following elements: a) ascertaining a first variable that characterizes the length of the particular bit sequence, b) ascertaining a second variable that characterizes a particular deviation of the length of the particular bit sequence from a reference bit sequence, c) ascertaining at least one first piece of information that characterizes a sender of the particular bit sequence, for example a fingerprint characterizing the sender. For example, in further exemplary specific embodiments of the present invention, the multiple bit sequences may be obtained or ascertained at different times, for example by receiving the appropriate signal. In further exemplary specific embodiments, the multiple bit sequences may, for example, be part of the same message or communication which, for example, is sent by a sender via the bus system.

In further exemplary specific embodiments of the present invention, it is provided that the method includes: ascertaining one or multiple time range features and/or frequency range features that characterize a sender of the bit sequence.

In further exemplary specific embodiments of the present invention, the time range features include at least one of the following elements: average value, variance, asymmetry (for example, characterizable by the difference between the rise time and the fall time of the signal).

In further exemplary specific embodiments of the present invention, the frequency range features include at least one of the following elements: irregularity or flatness.

In further exemplary specific embodiments of the present invention, the irregularity may be ascertained, for example, based on the expression $$\frac{\sum_{j=1}^{M-1}(y_m(j)-y_m(j+1))^2}{\sum_{j=1}^{M-1}y_m(j)^2},$$

where $y_m$ characterizes magnitude coefficients and M characterizes the number of magnitude coefficients, for example of a signal under consideration.

In further exemplary specific embodiments of the present invention, it is provided that the method includes: associating the first variable and/or the second variable and/or the first piece of information with a sender, for example with the aid of a model, for example a statistical model, and optionally adapting the model.

Further exemplary specific embodiments of the present invention relate to a device for carrying out the method according to the specific embodiments.

In further exemplary specific embodiments of the present invention, it is provided that the device includes: a computer including at least one processor core, for example, a memory device associated with the computer for at least temporarily storing at least one of the following elements: a) data, b) a computer program, in particular for carrying out the method according to the specific embodiments.

In further exemplary specific embodiments of the present invention, the data may include, at least temporarily, the signal or the bit sequence or a representation (in particular also time- and/or value-discrete) of the signal or the bit sequence and/or data derivable therefrom, for example the first variable and/or the second variable.

In further exemplary specific embodiments of the present invention, the memory device includes a volatile memory (working memory (RAM), for example) and/or a nonvolatile memory (flash EEPROM, for example) or a combination thereof or with other types of memory not explicitly stated.

Further exemplary specific embodiments of the present invention relate to a computer-readable memory medium that includes commands which, when executed by a computer, prompt the computer to carry out the method according to the specific embodiments.

Further exemplary specific embodiments of the present invention relate to a computer program that includes commands which, when the program is executed by a computer, prompt the computer to carry out the method according to the specific embodiments.

Further exemplary specific embodiments of the present invention relate to a data carrier signal that transfers and/or characterizes the computer program according to the specific embodiments.

Further exemplary specific embodiments of the present invention relate to a use of the method according to the specific embodiments and/or of the device according to the specific embodiments and/or of the computer-readable memory medium according to the specific embodiments and/or of the computer program according to the specific embodiments and/or of the data carrier signal according to the specific embodiments for at least one of the following elements: a) evaluating a signal that is, for example, transferred and/or receivable via a bus system, b) identifying a sender, c) checking the authenticity of a sender, d) detecting intrusions, for example on the bus system.

Further features, application options, and advantages of the present invention result from the following description of exemplary embodiments of the present invention, illustrated in the figures. All described or illustrated features, alone or in any arbitrary combination, constitute the subject matter of the present invention, regardless of their wording or illustration in the description or figures, respectively.

DETAILED DESCRIPTION OF EXAMPLE EMBODIMENTS

Exemplary specific embodiments (cf. FIGS. 1A, 9) relate to a method, for example a computer-implemented method, for evaluating a signal Sig that is, for example, transferred and/or receivable via a bus system 10, including: ascertaining 100 (FIG. 1A) a first variable G1 that characterizes a length of a bit sequence BS associated with signal Sig, for example, bit sequence BS including n bits, where n is greater than or equal to one, and optionally ascertaining 102 a second variable G2 that characterizes a deviation of the length of bit sequence BS from a reference bit sequence that includes n bits.

Figure 1A:
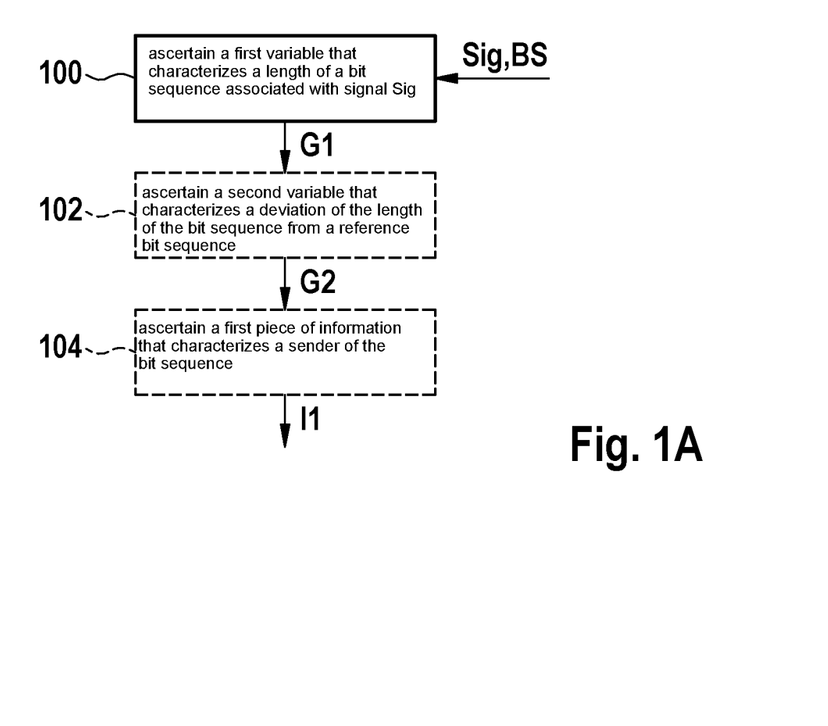
FIG. 1A schematically shows a simplified flowchart according to exemplary specific embodiments of the present invention.
Figure 9:
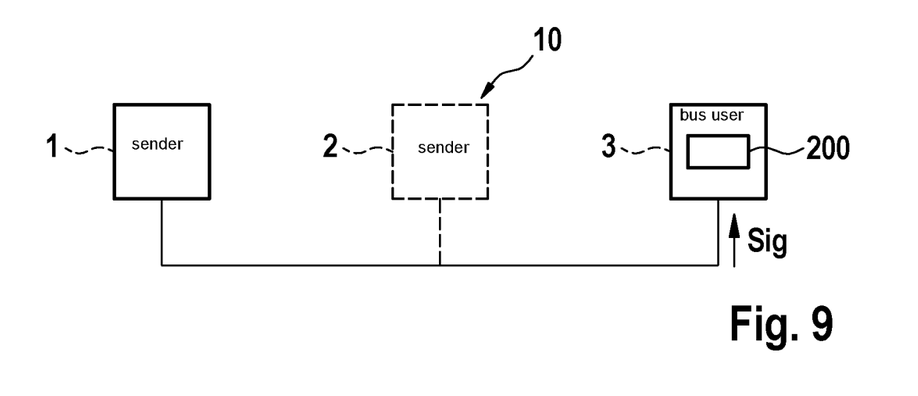
FIG. 9 schematically shows a simplified block diagram according to exemplary specific embodiments of the present invention.

In further exemplary specific embodiments, bit sequence BS is part of signal Sig or corresponds to signal Sig. For example, the bit sequence may correspond to n bits, for example signal Sig or bit sequence BS having a length that is characterizable, for example, by a time (duration) that is longer (or optionally shorter) than an n-multiple of the bit duration of bus system 10.

Bus system 10 may be a CAN bus system, for example. In further exemplary specific embodiments, bus system 10 may also be of a type other than the CAN type stated by way of example.

In further exemplary specific embodiments, the method according to exemplary specific embodiments and/or the bus system may be used in a vehicle or a robot or the like.

The method according to exemplary specific embodiments may be carried out by device 200 (FIG. 9), for example, which is associated, for example, with a bus user 3 of bus system 10 and/or integrated into bus user 3. Bus user 3 may receive, for example, signals Sig from at least one further bus user 1, 2.

In further exemplary specific embodiments, it is provided that the reference bit sequence is a rectangular-pulse signal.

In further exemplary specific embodiments, it is provided that the method includes: ascertaining 104 a first piece of information I1 that characterizes a sender of bit sequence BS, for example a fingerprint characterizing the sender, it being possible, for example, to carry out ascertaining 104 of first piece of information I1 characterizing the sender of bit sequence BS, based on first variable G1 and/or based on second variable G2 and/or based on first variable G1 and second variable G2.

Figure 1B:
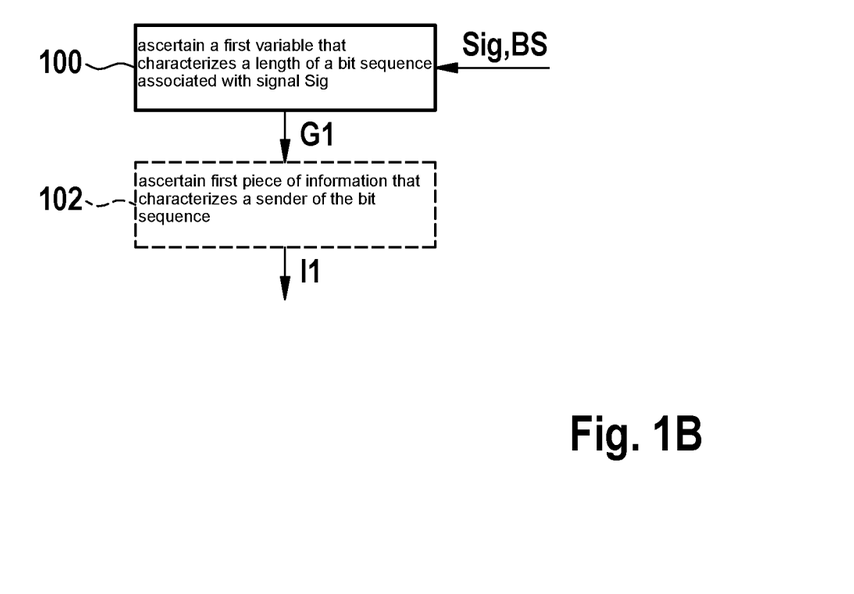
FIG. 1B schematically shows a simplified flowchart according to exemplary specific embodiments of the present invention.

In further exemplary specific embodiments, FIG. 1B, by way of example the following procedure is accordingly provided: ascertaining a first variable G1 that characterizes a length of a bit sequence BS associated with signal Sig, for example, bit sequence BS including n bits, where n is greater than or equal to one, and ascertaining 102 a first piece of information I1 that characterizes a sender of bit sequence BS, for example a fingerprint characterizing the sender, for example based on first variable G1, for example not based on second variable G2. In other words, ascertaining 102 (Figure TA) second variable G2 is not provided in some exemplary specific embodiments.

Figure 2:
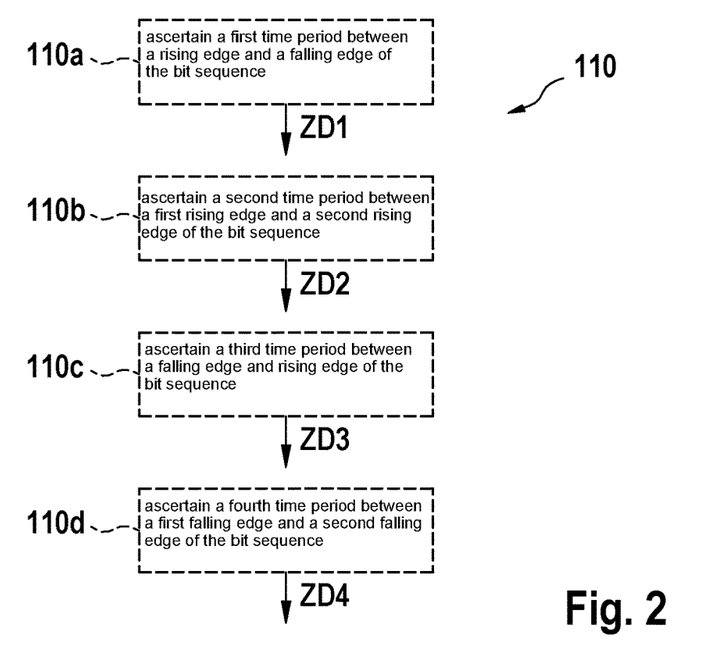
FIG. 2 schematically shows a simplified flowchart according to exemplary specific embodiments of the present invention.
Figure 3:
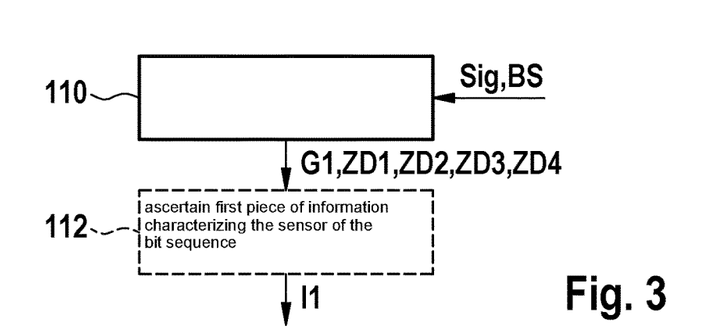
FIG. 3 schematically shows a simplified flowchart according to exemplary specific embodiments of the present invention.
Figure 12:
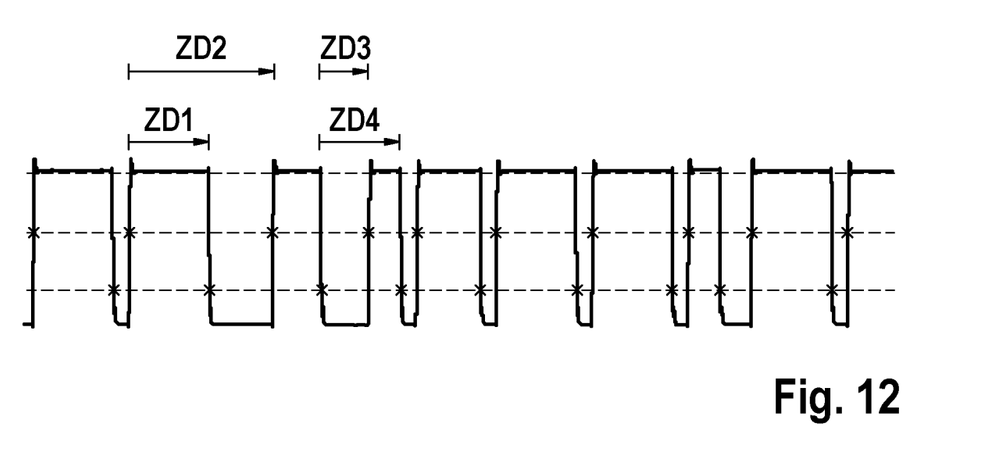
FIG. 12 schematically shows a simplified diagram according to exemplary specific embodiments of the present invention.

In further exemplary specific embodiments, FIGS. 2, 3, it is provided that the method includes at least one of the following elements 110: a) ascertaining 110a a first time period ZD1 between a rising edge and a falling edge of bit sequence BS, b) ascertaining 110b a second time period ZD2 between a first rising edge and a second rising edge of bit sequence BS, c) ascertaining 110c a third time period ZD3 between a falling edge and a rising edge of bit sequence BS, d) ascertaining 110d a fourth time period ZD4 between a first falling edge and a second falling edge of bit sequence BS, for example bit sequence BS including one or multiple identical or different symbols, for example within the particular time period. FIG. 12 shows different time periods ZD1, ZD2, ZD3, ZD4 by way of example, based on an example of a signal.

In further exemplary specific embodiments, first time period ZD1 and/or second time period ZD2 and/or third time period ZD3 and/or fourth time period ZD4 may be regarded as an example of first variable G1 (FIG. 1A, 1B) according to some exemplary specific embodiments.

In further exemplary specific embodiments, FIG. 3, it is provided that the method includes: ascertaining 112 first piece of information I1 characterizing the sender of bit sequence BS (a fingerprint, for example), based on at least one of the following elements: a) first time period ZD1, b) second time period ZD2, c) third time period ZD3, d) fourth time period ZD4.

In further exemplary specific embodiments, it is provided that bit sequence BS contains data that have been ascertainable or ascertained or received outside an arbitration phase of signal Sig. In further exemplary specific embodiments, bit sequence BS is accordingly ascertained while no arbitration is taking place, for example on bus system 10 (FIG. 9).

Figure 4:
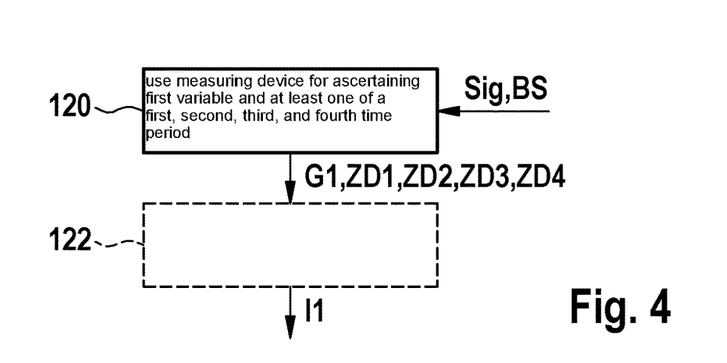
FIG. 4 schematically shows a simplified flowchart according to exemplary specific embodiments of the present invention.

In further exemplary specific embodiments, FIG. 4, it is provided that the method includes: using 120 a measuring device TMC (cf. FIG. 13A, for example) for ascertaining first variable G1 and/or at least one of the following elements: a) first time period ZD1, b) second time period ZD2, c) third time period ZD3, d) fourth time period ZD4, measuring device TMC including at least one of the following elements, for example: A) a time-to-digital converter (TDC), B) a hardware circuit, C) an application-specific integrated circuit (ASIC).

Figure 5:
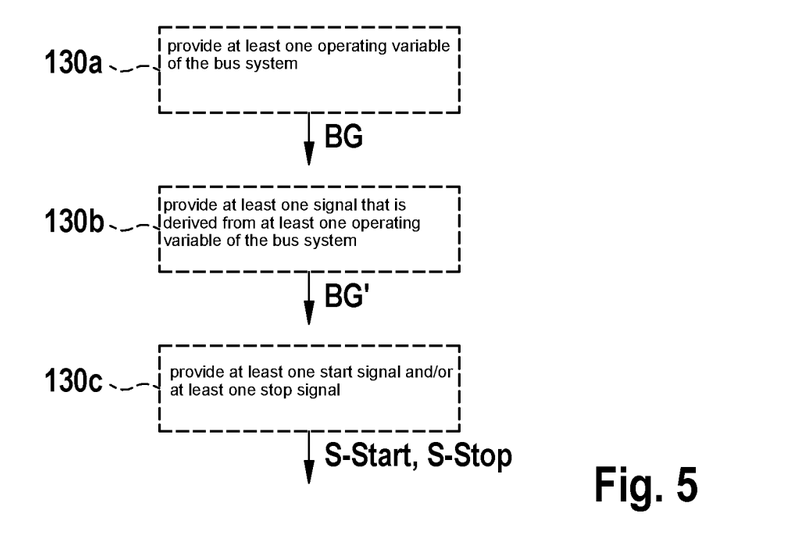
FIG. 5 schematically shows a simplified flowchart according to exemplary specific embodiments of the present invention.

In further exemplary specific embodiments, FIG. 5, it is provided that the method includes: a) providing 130a at least one operating variable BG of bus system 10, for example for a or the measuring device TMC, for example for ascertaining first variable G1, the at least one operating variable BG of bus system 10 including, for example: an electrical potential or an electrical voltage of at least one bus line, b) providing 130b at least one signal BG' that is derived from at least one operating variable BG of bus system 10, for example for a or the measuring device TMC, c) providing 130c at least one start signal S-start and/or at least one stop signal S-stop, for example for a or the measuring device TMC.

Figure 6:
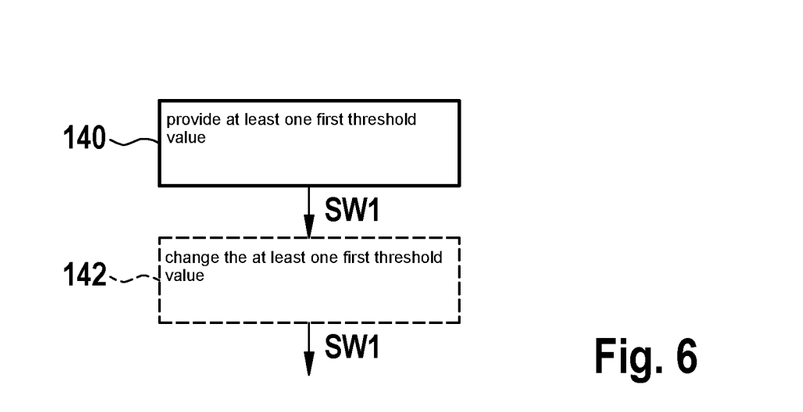
FIG. 6 schematically shows a simplified flowchart according to exemplary specific embodiments of the present invention.

In further exemplary specific embodiments, FIG. 6, it is provided that the method includes: providing 140 at least one first threshold value SW1, for example for ascertaining the first variable (or the time period), for example, and optionally changing 142 the at least one first threshold value SW1, it being possible for changing 142 to take place, for example, dynamically, for example while carrying out the method, for example during operation of a device 200 (FIG. 9) that is provided for carrying out the method.

Figure 7:
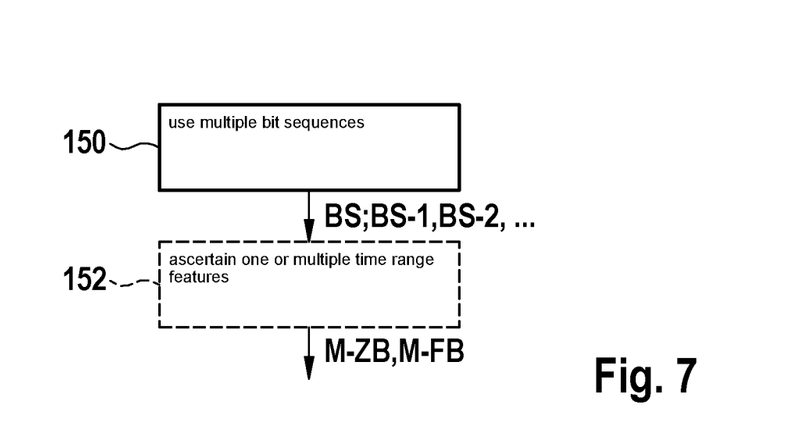
FIG. 7 schematically shows a simplified flowchart according to exemplary specific embodiments of the present invention.

In further exemplary specific embodiments, FIG. 7, it is provided that the method includes: using 150 multiple, for example different, bit sequences BS, BS-1, BS-2, . . . , for example for at least one of the following elements: a) ascertaining 100 (FIG. 1A) a first variable G1 that characterizes the length of the particular bit sequence, b) ascertaining 102 a second variable G2 that characterizes a particular deviation of the length of the particular bit sequence from a reference bit sequence, c) ascertaining 104 at least one first piece of information I1 that characterizes a sender of the particular bit sequence, for example a fingerprint characterizing the sender.

For example, in further exemplary specific embodiments, multiple bit sequences BS, BS-1, BS-2, . . . may be obtained or ascertained at different times, for example by receiving appropriate signal Sig. In further exemplary specific embodiments, multiple bit sequences BS, BS-1, BS-2, . . . may, for example, be part of the same message or communication which, for example, is sent by a sender 1 via bus system 10.

In further exemplary specific embodiments, FIG. 7, it is provided that the method includes: ascertaining 152 one or multiple time range features M-ZB and/or frequency range features M-FB that characterize a sender 1 of bit sequence BS.

In further exemplary specific embodiments, time range features M-ZB include at least one of the following elements: average value, variance, asymmetry (for example, characterizable by the difference between the rise time and the fall time of the signal).

In further exemplary specific embodiments, frequency range features M-FB include at least one of the following elements: irregularity or flatness.

Figure 8:
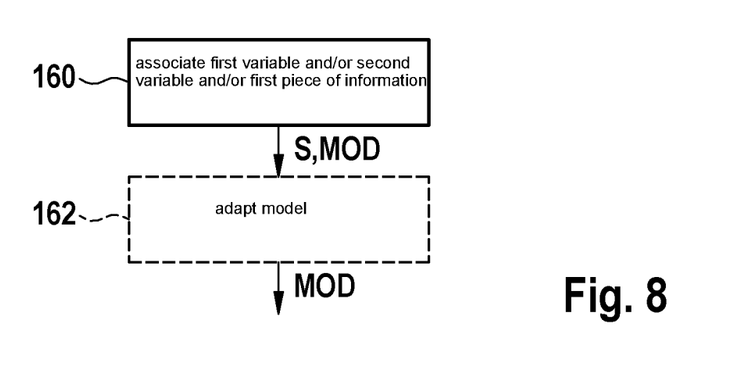
FIG. 8 schematically shows a simplified flowchart according to exemplary specific embodiments of the present invention.

In further exemplary specific embodiments, FIG. 8, it is provided that the method includes: associating 160 first variable G1 and/or second variable G2 and/or first piece of information I1 with a sender S, for example with the aid of a model MOD, for example a statistical model, and optionally adapting 162 model MOD.

Figure 10A:
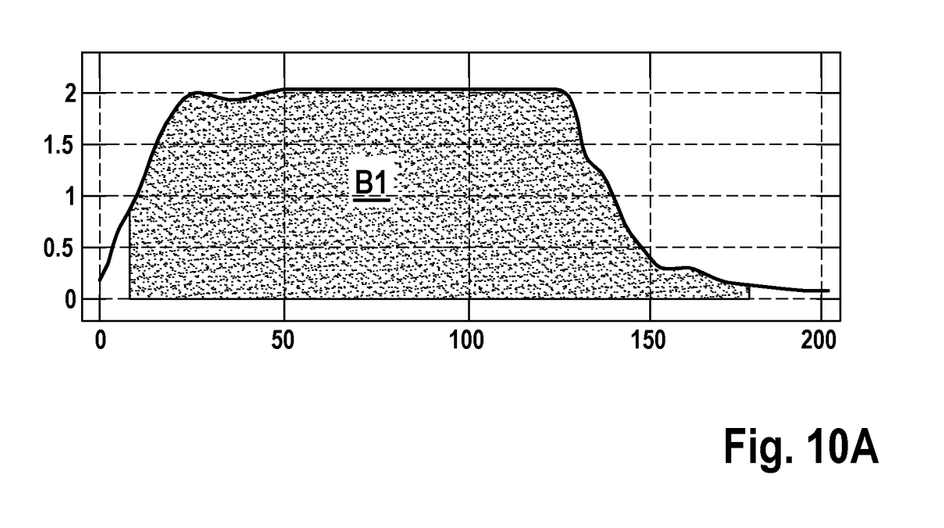
FIG. 10A schematically shows a simplified diagram according to exemplary specific embodiments of the present invention.
Figure 10B:
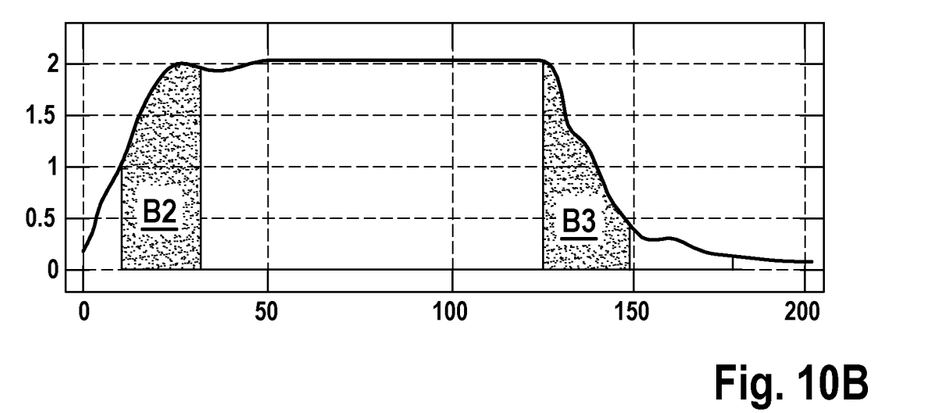
FIG. 10B schematically shows a simplified diagram according to exemplary specific embodiments of the present invention.

FIGS. 10A, 10B schematically show in each case a simplified diagram of a temporal profile of a signal voltage as a function of time according to exemplary specific embodiments, area B1 in FIG. 10A symbolizing by way of example an average symbol duration of signal Sig, for example (FIG. 9), and "edge areas" B2, B3 depicted in FIG. 10B symbolizing by way of example an asymmetry, which in further exemplary specific embodiments is characterizable by first variable G1 and/or second variable G2, for example.

Figure 11:
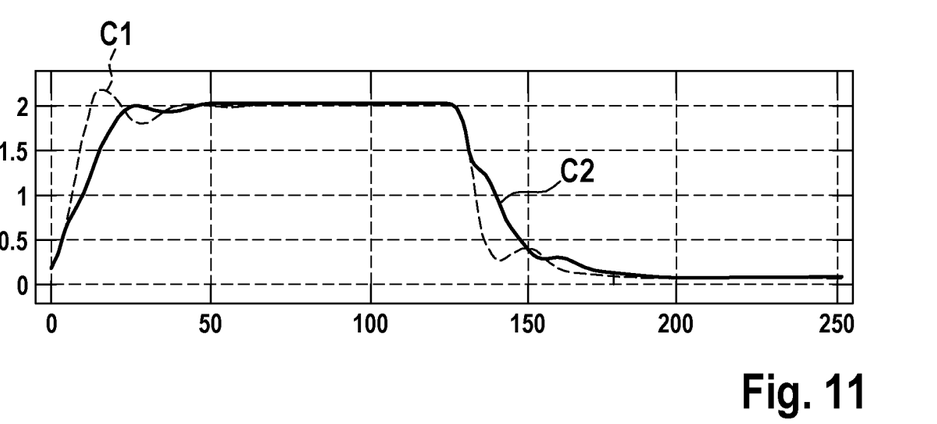
FIG. 11 schematically shows a simplified diagram according to exemplary specific embodiments of the present invention.

In further exemplary specific embodiments, the shape or asymmetry of edge areas B2, B3, for example specifically for a certain sender 1, may be a function, for example, of rise times and/or fall times of the signal, it being possible, for example, for different asymmetries to result in each case for different senders 1, 2, as depicted in FIG. 11 by way of example. Curve C1 characterizes a signal pattern or an associated voltage as a function of time for a first sender 1, and curve C2 characterizes a signal pattern or an associated voltage as a function of time for a second sender 2.

FIG. 12 schematically shows a simplified diagram of a signal plotted as a function of time according to exemplary specific embodiments, in which different time periods ZD1, ZD2, ZD3, ZD4 are indicated by way of example between falling and/or rising edges.

Figure 13A:
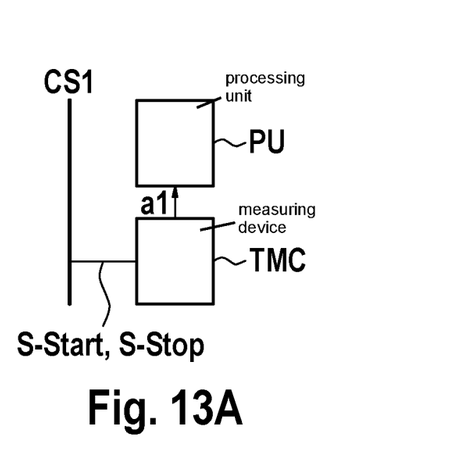
FIG. 13A schematically shows a simplified block diagram according to exemplary specific embodiments of the present invention.

FIG. 13A schematically shows a simplified block diagram according to exemplary specific embodiments, in which measuring device TMC, based on a CAN signal CS1, for example obtains or ascertains a start signal S-start and a stop signal S-stop, and based on start signal S-start and stop signal S-stop, for example ascertains first variable G1 or at least one time period ZD1, ZD2, ZD3, ZD4 and outputs same to a processing unit PU, for example (cf. arrow a1), which in further exemplary specific embodiments is designed, for example, to ascertain first pieces of information I1 on this basis.

Figure 13B:
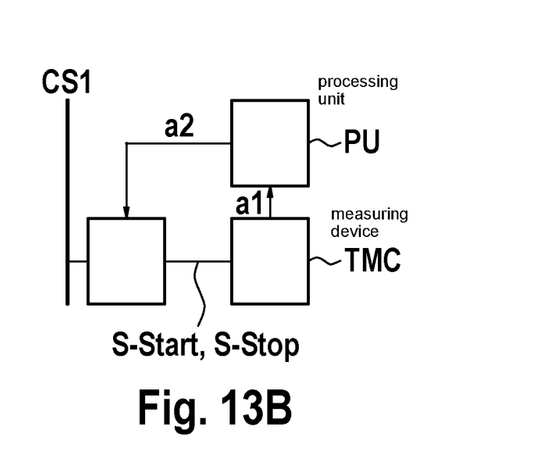
FIG. 13B schematically shows a simplified block diagram according to exemplary specific embodiments of the present invention.

FIG. 13B schematically shows a simplified block diagram according to exemplary specific embodiments, in which measuring device TMC obtains a start signal S-start and a stop signal S-stop from a preprocessing unit VVE, for example a comparator or including at least one comparator, and for example outputs a result a1, ascertained on this basis, to processing unit PU. In further exemplary specific embodiments, processing unit PU may be designed to at least temporarily control or configure preprocessing unit VVE, for example to output at least one default value a2 (a threshold value, for example) for a comparator of preprocessing unit VVE.

Figure 13C:
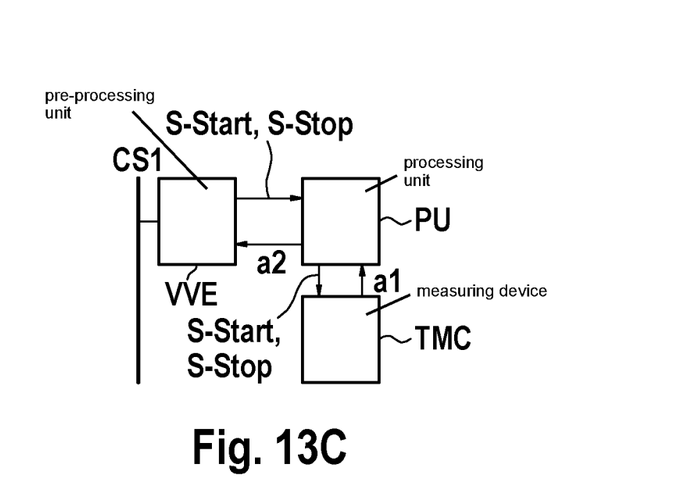
FIG. 13C schematically shows a simplified block diagram according to exemplary specific embodiments of the present invention.

FIG. 13C schematically shows a configuration similar to FIG. 13B, in which preprocessing unit VVE provides a start signal S-start and a stop signal S-stop, which are outputtable from processing unit PU to measuring device TMC.

In further exemplary specific embodiments, one or multiple of components TMC, PU, VVE may each be designed as a discrete component or integrated into a device, for example device 200 (FIG. 9).

Figure 14:
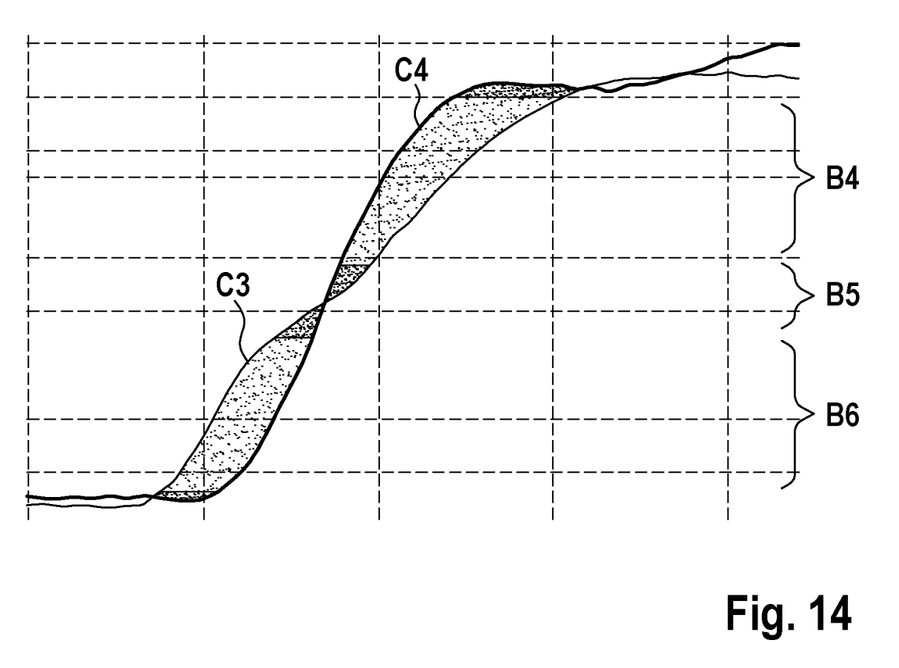
FIG. 14 schematically shows signals according to further exemplary specific embodiments of the present invention.

FIG. 14 schematically shows signals according to further exemplary specific embodiments, curve C3 symbolizing a rising edge of a signal of a first sender 1 (FIG. 9) and curve C4 symbolizing a rising edge of a signal of a second sender 2 (FIG. 9). As an example, curly brackets B4, B6 each symbolize an area for a suitable threshold value, for example for a comparator, for example for controlling a start and/or stop of a measurement, while in further exemplary specific embodiments area B5 is less suitable.

Figure 15:
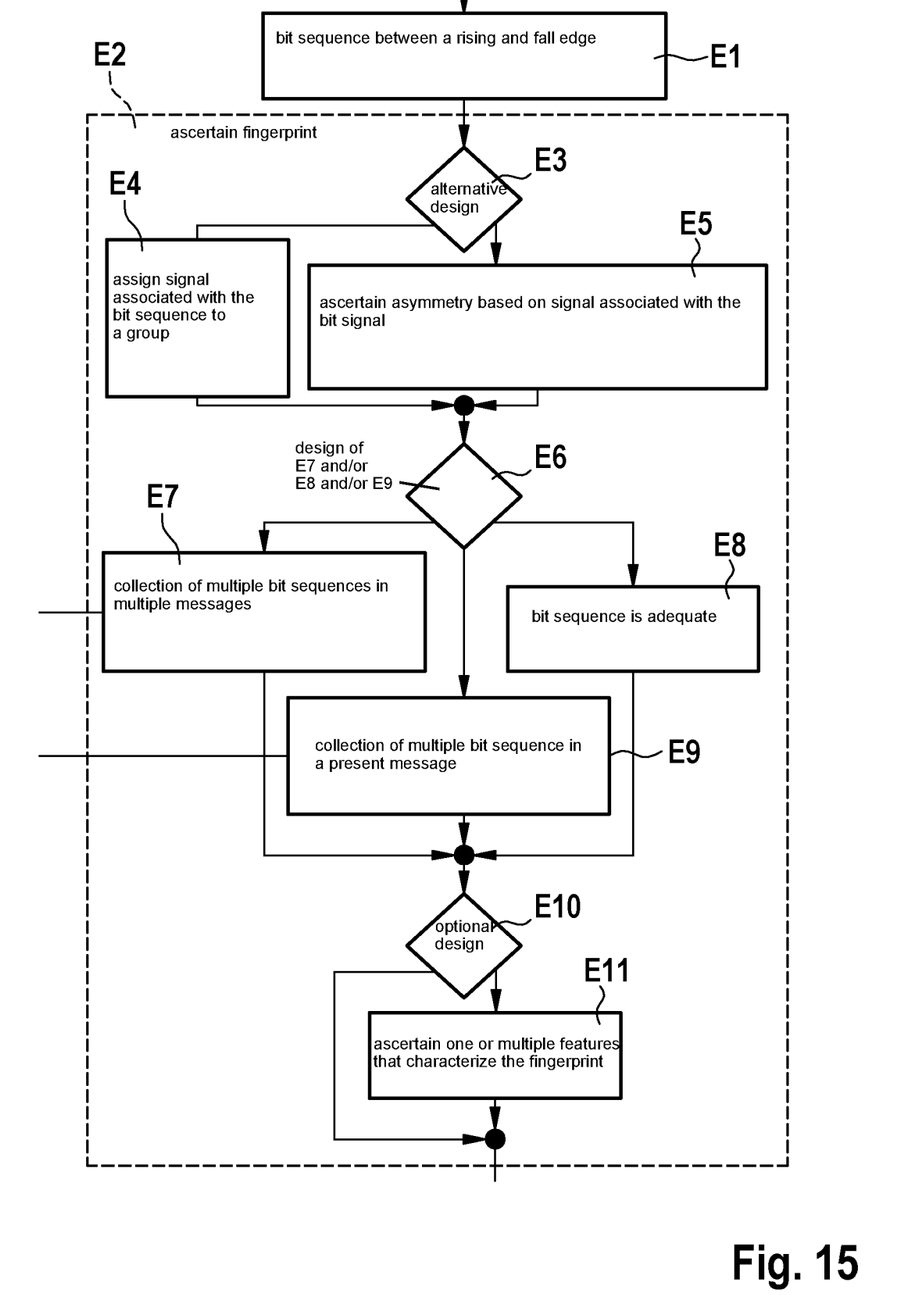
FIG. 15 schematically shows a simplified flowchart according to exemplary specific embodiments of the present invention.

FIG. 15 schematically shows a simplified flowchart according to exemplary specific embodiments. Block E1 symbolizes by way of example a bit sequence BS, for example between a rising edge and a falling edge. Block E2 symbolizes by way of example the ascertainment or creation of a fingerprint according to further exemplary specific embodiments. Block E3 symbolizes by way of example a) an alternative design of blocks E4, E5 or b) a design of block E4 and of block E5, block E4 symbolizing by way of example the assignment of a signal associated, for example, with the bit sequence according to block E1, to a group, block E5 symbolizing by way of example ascertaining an asymmetry based on the signal associated, for example, with the bit sequence according to block E1.

In further exemplary specific embodiments, ascertaining E5 the asymmetry may take place, for example, by difference formation of the length of the bit sequence and a product of a bit time and the number of bits of the bit sequence, for example according to the following: (length of the bit sequence)−(bit time*number of bits).

Block E6 symbolizes by way of example a design of blocks E7 and/or E8 and/or E9, block E7 symbolizing by way of example collection of multiple bit sequences in multiple messages, for example, block E8 indicating, for example, that a bit sequence is adequate, and block E9 symbolizing collection of multiple bit sequences in a (present, for example) message.

Block E10 symbolizes an optional design of block E11, and block E11 symbolizes ascertaining, for example, one or multiple features that characterize the fingerprint, for example.

Figure 16:
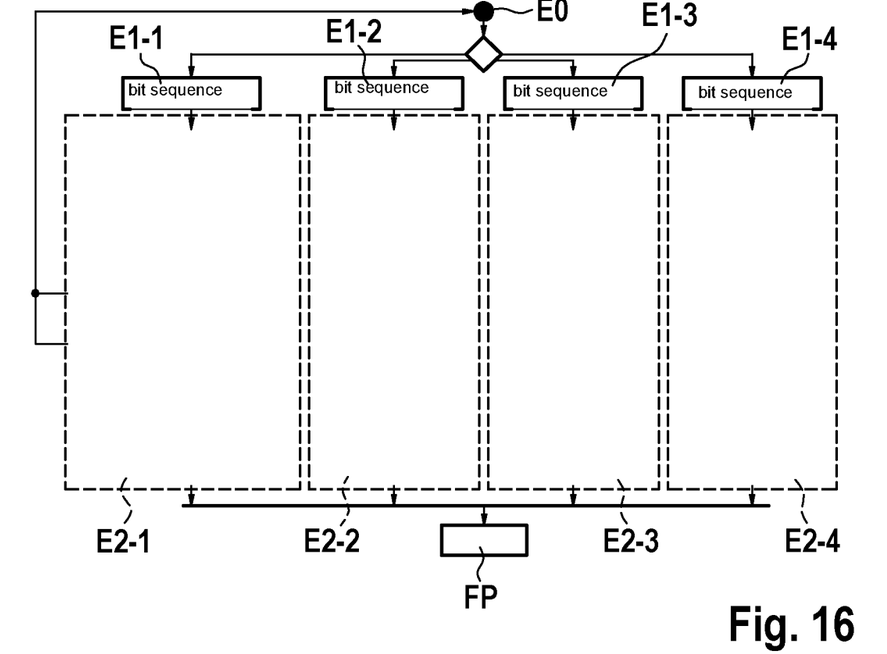
FIG. 16 schematically shows a simplified flowchart according to exemplary specific embodiments of the present invention.

FIG. 16 schematically shows a simplified flowchart according to exemplary specific embodiments. Element E0 symbolizes ascertaining, for example measuring, lengths of one or multiple bit sequences, for example in received CAN messages. Elements E1-1, E1-2, E1-3, E1-4 symbolize bit sequences, element E1-1 by way of example characterizing at least one bit sequence between a rising edge and a falling edge of a corresponding signal, E1-2 by way of example characterizing at least one bit sequence between a rising edge and a (further) rising edge of a corresponding signal, E1-3 by way of example characterizing at least one bit sequence between a falling edge and a rising edge of a corresponding signal, and E1-4 by way of example characterizing at least one bit sequence between a falling edge and a (further) falling edge of a corresponding signal.

In further exemplary specific embodiments, at least one of branches (E1-1, E2-1), (E1-2, E2-2), (E1-3, E2-3), (E1-4, E2-4) may be designed, for example, to ascertain a fingerprint FP of the sender.

In further exemplary specific embodiments, block E2-1 according to FIG. 16 may be designed, for example, according to or at least similarly to block E2 according to FIG. 15. This similarly also applies for blocks E2-2, E2-3, E2-4 in further exemplary specific embodiments.

Figure 17:
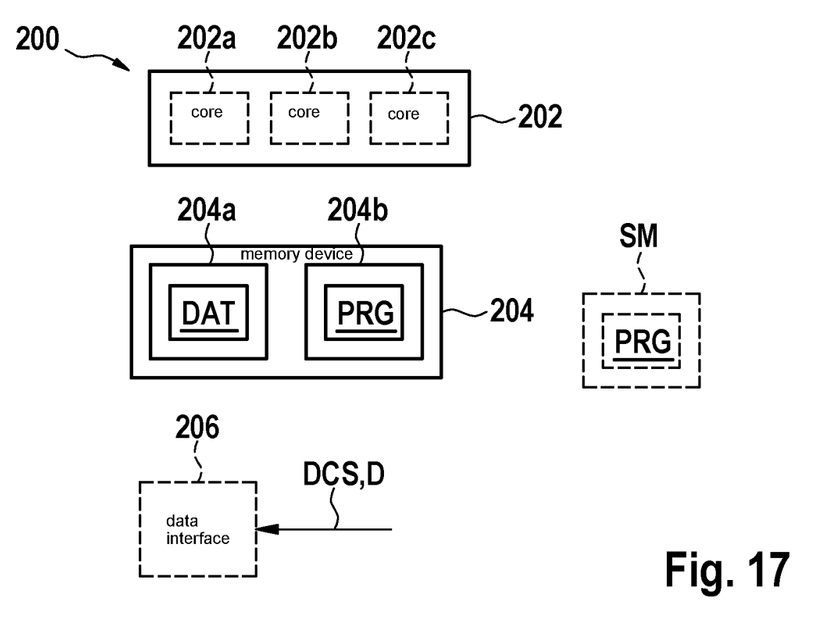
FIG. 17 schematically shows a simplified block diagram according to exemplary specific embodiments of the present invention.

Further exemplary specific embodiments, FIG. 17, relate to a device 200 for carrying out the method according to the specific embodiments.

In further exemplary specific embodiments, it is provided that device 200 includes: a computer 202 including at least one processor core 202a, 202b, 202c, for example, a memory device 204, associated with computer 202, for at least temporarily storing at least one of the following elements: a) data DAT (for example, the bit sequence or a digital representation of signal Sig and/or at least one other value or other piece of data, for example ZD1, ZD2, ZD3, ZD4, G1, G2, I1), b) a computer program PRG, in particular for carrying out the method according to the specific embodiments.

In further exemplary specific embodiments, data DAT may include, at least temporarily, signal Sig or bit sequence BS or a representation (in particular also time- and/or value-discrete) of signal Sig or bit sequence BS and/or data derivable therefrom, for example first variable G1 and/or second variable G2.

In further exemplary specific embodiments, memory device 204 includes a volatile memory 204a (working memory (RAM), for example) and/or a nonvolatile memory 204b (flash EEPROM, for example) or a combination thereof or with other types of memory not explicitly stated.

Further exemplary specific embodiments relate to a computer-readable memory medium SM, including commands PRG which, when executed by a computer 202, prompt the computer to carry out the method according to the specific embodiments.

Further exemplary specific embodiments relate to a computer program PRG that includes commands which, when program PRG is executed by a computer 202, prompt the computer to carry out the method according to the specific embodiments.

Further exemplary specific embodiments relate to a data carrier signal DCS that transfers and/or characterizes computer program PRG according to the specific embodiments. For example, data carrier signal DCS is transferable via an optional data interface 206, for example the same as with further data D for device 200, which are usable for creating a fingerprint FP, for example.

In further exemplary specific embodiments, optional data interface 206 may also be designed for data exchange (sending and/or receiving) via bus system 10.

Figure 18:
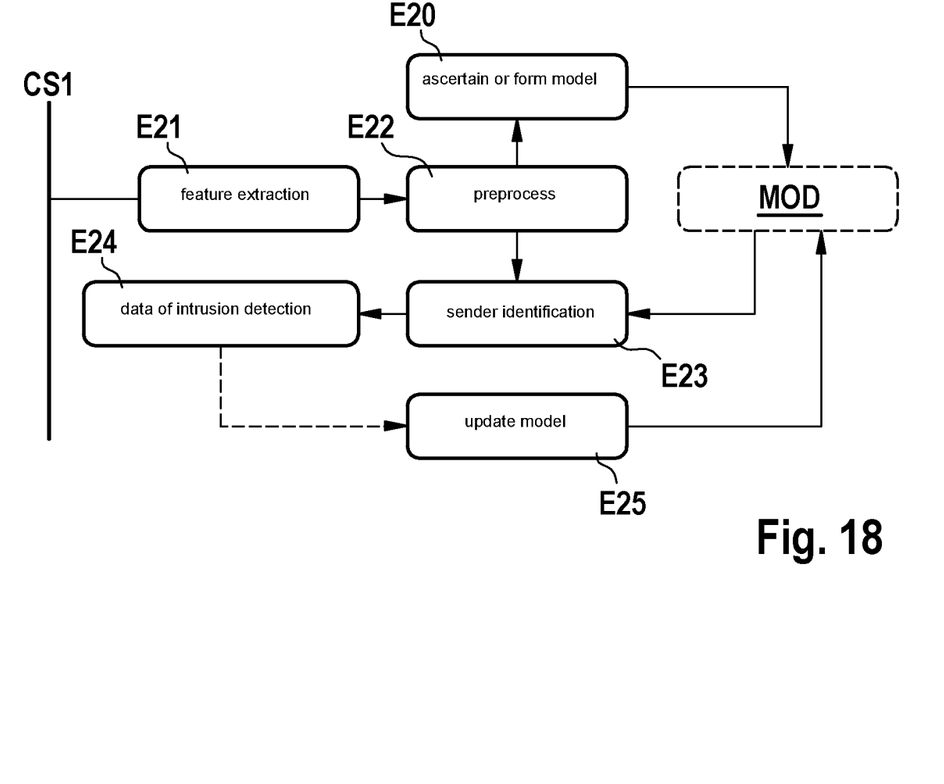
FIG. 18 schematically shows a simplified flowchart according to exemplary specific embodiments of the present invention.

FIG. 18 schematically shows a simplified flowchart according to further specific embodiments. Block E20 symbolizes the ascertaining or forming of a model MOD, for example based on preprocessing E22 or feature extraction of lengths of at least one bit sequence that are ascertained with the aid of block E21. Block E23 symbolizes an optional identification of a sender 1 (FIG. 9), for example based on model MOD and on data of preprocessing E22.

In further exemplary specific embodiments, an intrusion detection may optionally be carried out, for example on sender identification E23, and/or a response to a detected intrusion may be made.

In further exemplary specific embodiments, model MOD may optionally be updated (cf. block E25), for example based on data of intrusion detection E24.

Figure 19:
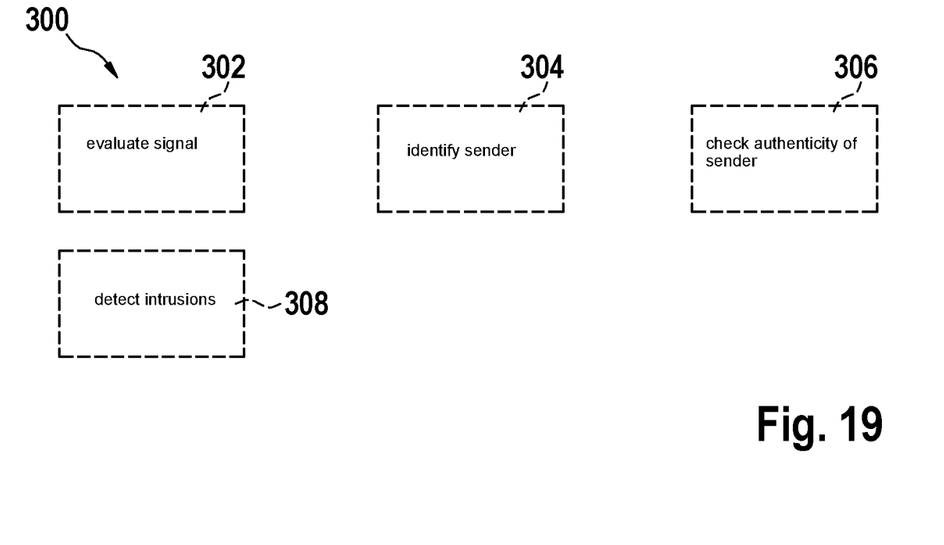
FIG. 19 schematically shows aspects of uses according to further exemplary specific embodiments of the present invention.

Further exemplary specific embodiments, FIG. 19, relate to a use 300 of the method according to the specific embodiments and/or of the device according to the specific embodiments and/or of the computer-readable memory medium according to the specific embodiments and/or of the computer program according to the specific embodiments and/or of the data carrier signal according to the specific embodiments for at least one of the following elements: a) evaluating 302 a signal Sig that is, for example, transferred and/or receivable via a bus system 10, b) identifying 304 a sender, c) checking 306 the authenticity of a sender, d) detecting 308 intrusions, for example on the bus system.

Further aspects and exemplary specific embodiments, each of which may be combined, individually or in combination with one another, with at least one of the specific embodiments described above by way of example are described below.

In further exemplary specific embodiments, a variable that characterizes asymmetry based on a received or receivable signal Sig may be cost-efficiently determined with the aid of a time measurement or measurement of a signal duration. In further exemplary specific embodiments, for example at least one time-to-digital converter may be used.

In further exemplary specific embodiments, it may be ascertained dynamically, for example during operation, when measurements, for example for the signal duration, are started and/or stopped, resulting, for example, in increased robustness of the detection and/or speed of the detection (also of possible intrusions, for example), the execution also being possible on embedded systems, for example.

In further exemplary specific embodiments, a signal shape of an analog signal, as used during a message transfer via bus system 10, is influenced or determined, for example, by a topology of bus system 10 and for example comparatively small manufacturing-related variations or differences, for example, in the electronic components of a sender 1, for example, which may influence a signal rise time and/or a signal fall time, it being possible, for example, for a rise time to be influenced differently than a fall time.

In further exemplary specific embodiments, a deviation of the actual signal shape of the signal from an ideal rectangular-pulse signal, for example, is used to characterize an asymmetry of the signal. Since in further exemplary specific embodiments the asymmetry is different for each sender 1, 2, for example an intrusion detection system and/or a system for identifying a sender may be implemented based on the asymmetry or on a variable G1, G2 that characterizes the asymmetry.

In further exemplary specific embodiments, the asymmetry is quantified, for example with the aid of first and/or second variable G1, G2, for example based on a measurement of a time period between two state transitions of signal Sig. In further exemplary specific embodiments, multiple time periods between, for example, different state transitions of signal Sig are ascertained (cf. FIG. 12, for example). In further exemplary specific embodiments, a sequence of one or multiple identical or different symbols may be present between the two state transitions.

In further exemplary specific embodiments, for example a fingerprint of a sender 1 is ascertained based on one or multiple of time periods ZD1, ZD2, ZD3, ZD4.

In further exemplary specific embodiments, the number of measurements, for example for each message of signal Sig, may be predefined or dynamically selected, for example based on the capability of device 200.

In further exemplary specific embodiments, a received signal may be evaluated for ascertaining the first and/or second variable. For example, for a differential bus system 10, for example at least one of the two differential bus signals (for example, CAN high and/or CAN low in the case of a CAN bus system 10) may be used.

In further exemplary specific embodiments, a signal between a CAN receiver and a CAN controller may also be evaluated for ascertaining the first and/or second variable.

In further exemplary specific embodiments, start signals and/or stop signals for measurements, for example with the aid of measuring device TMC, may be formed, for example based on a voltage level of signal Sig (cf. FIGS. 13A, 13B, 13C).

In further exemplary specific embodiments, a comparator, for example a voltage comparator, may be used, for example in preprocessing unit VVE, for example to select or set an optimal, for example, voltage threshold for the start signal and/or the stop signal, thus making it possible to improve a differentiation between different senders in further exemplary specific embodiments.

In further exemplary specific embodiments, a threshold value for the voltage or the stated voltage threshold may also be changed, for example dynamically, for example during runtime of device 200, for example using a digital-to-analog converter (DAC).

In further exemplary specific embodiments, the fingerprint of sender 1 sending the bit or the bit sequence may be ascertained, for example as soon as the first variable for a bit (corresponding to a bit sequence having length 1) or a bit sequence including multiple bits has been ascertained. In further exemplary specific embodiments, the fingerprint allows, for example, the sender to be identified, for example by comparison to a reference fingerprint.

In further exemplary specific embodiments, it may be selected which types of state transitions (rising edge/falling edge) are considered (cf. the time periods according to FIG. 12, for example), for example one or multiple pairs of state transitions being usable (cf. also FIG. 16).

In further exemplary specific embodiments, the ascertained lengths of the bit sequence(s), for example in each case characterizable or representable by first variable G1, may, for example, be divided into groups, for example based on the number of bits associated with the bit sequence under consideration. In further exemplary specific embodiments, alternatively or additionally an asymmetry may be ascertained, which for example is characterizable or representable by a difference between the ascertained length of the bit sequence(s) and an n-multiple of the bit duration, where n represents the number of bits of the particular sequence under consideration, for example according to the following: (length of the bit sequence)−(bit time*number of bits). A graphical illustration of the asymmetry has been explained above by way of example with reference to FIG. 10B.

In further exemplary specific embodiments, the ascertained lengths of the bit sequence(s) may be used directly as a fingerprint or fingerprints.

In further exemplary specific embodiments, the fingerprints may be ascertained based on one or multiple, for example received, messages, for example one or multiple features from the messages, for example one or multiple time range features M-ZB (FIG. 7) and/or one or multiple frequency range features M-FB, being initially ascertained. Details in this regard have already been described above with reference to FIG. 7.

Exemplary specific embodiments for ascertaining a fingerprint have also been described, for example with reference to FIG. 16.

In further exemplary specific embodiments, an association between possible senders 1, 2, 3 and a particular fingerprint may be ascertained. In further exemplary specific embodiments, for example statistical models MOD (FIGS. 8, 18) may be used for this purpose, for example based on probability distributions and/or with the aid of machine learning (ML) methods, for example based on naive Bayes classifiers.

In further exemplary specific embodiments, at least one model is adapted, for example during operation of device 200, for example to obtain or improve an achievable classification rate or identification rate.

In further exemplary specific embodiments, a method for reducing a temperature dependency of the ascertainment of the symbol durations or of the first or second variable may also be used, for example based on a temperature-dependent dynamic influence of threshold values for a start of the measurement and/or a stop of the measurement (cf. also start signal S-start and/or stop signal S-stop (FIG. 13A)).

In further exemplary specific embodiments, the at least one model MOD is created, for example in a secure environment, for example of a manufacturing unit of device 200.

Alternatively or additionally, cryptographic methods may be used, for example cryptographically safeguarded messages from possible senders 1, 2, the model also being modifiable in the field, for example prior to starting a trip of a vehicle that includes device 200.

In further exemplary specific embodiments, symbol durations or first variable G1 and/or second variable G2 may be ascertained using the at least one model MOD, on the basis of which a fingerprint, for example, is ascertainable. In further exemplary specific embodiments, for example the sender of a signal or of the symbols is identifiable by use of the fingerprint.

In further exemplary specific embodiments, the authenticity of a transferred message may be checked, for example based on knowledge of which sender is allowed to send which message. In further exemplary specific embodiments, for example when the authenticity of a message has been falsified, a countermeasure or error response may be initiated. An example of a procedure in this regard has been described above with reference to FIG. 18.

What is claimed is:

1. A computer-implemented method for evaluating a signal that is transferred and/or received via a bus system, the method comprising:
    receiving the signal via a bus of the bus system;
    ascertaining, using a measuring device, a first variable that characterizes a length of a bit sequence associated with the signal, the bit sequence including n bits, where n is greater than or equal to one, wherein the length of the bit sequence is a time duration of the bit sequence, wherein the measuring device includes at least one of the following elements: A) a time-to-digital converter, B) a hardware circuit, C) an application-specific integrated circuit (ASIC), D) an analog-to-digital converter;
    ascertaining a second variable that characterizes a deviation of the length of the bit sequence from a length of a reference bit sequence that includes n bits, wherein the length of the reference bit sequence is a time duration of the reference bit sequence;
    measuring, using the measuring device, a time duration of a first time period between a rising edge of the bit sequence and a next, falling edge of the bit sequence following the rising edge,
    measuring, using the measuring device, a time duration of a second time period between a first rising edge of the bit sequence and a next, rising edge of the bit sequence following the first rising edge,
    measuring, using the measuring device, a time duration of a third time period between a falling edge of the bit sequence and a next, rising edge of the bit sequence following the falling edge,
    measuring, using the measuring device, a time duration of a fourth time period between a first falling edge of the bit sequence and a second falling edge of the bit sequence following the first falling edge;
    ascertaining a first piece of information that characterizes a sender of the bit sequence based on the first variable and the second variable, wherein the first piece of information that characterizes the sender of the bit sequence is further based on the time duration of the first time period, the time duration of the second time period, the time duration of the third time period, and the time duration of the fourth time period, and wherein the first piece of information is a fingerprint characterizing the sender;
    detecting an intrusion on the bus system based on the first piece of information; and
    initiating a countermeasure based on the detecting of the intrusion.

2. The method as recited in claim 1, wherein the reference bit sequence is a rectangular-pulse signal.

3. The method as recited in claim 1, wherein a) the bit sequence contains data that have been ascertained or received outside an arbitration phase of the signal, and/or b) the bit sequence contains data of a transfer in which only one sender sends.

4. The method as recited in claim 1, further comprising at least one of the following:
    a) providing at least one operating variable of the bus system for the measuring device, the at least one operating variable of the bus system including: an electrical potential or an electrical voltage of at least one bus line,
    b) providing at least one signal that is derived from at least one operating variable of the bus system from the measuring device,
    c) providing at least one start signal and/or at least one stop signal, for the measuring device to ascertain the first variable.

5. The method as recited in claim 1, further comprising:
    providing at least one first threshold value for the ascertaining of the first variable, and changing the at least one first threshold value, the changing taking place dynamically while carrying out the method during operation of a device that is provided for carrying out the method.

6. The method as recited in claim 1, further comprising:
    for each of multiple, different, bit sequences, performing at least one of the following elements: a) the ascertaining of the first variable that characterizes the length of the bit sequence, b) the ascertaining of the second variable that characterizes the deviation of the length of the bit sequence from the reference bit sequence, c) the ascertaining of the at least one first piece of information that characterizes the sender of the bit sequence.

7. The method as recited in claim 1, further comprising:
    ascertaining one or multiple time range features and/or frequency range features that characterize the sender of the bit sequence.

8. The method as recited in claim 1, further comprising:
    associating the first variable and/or the second variable and/or the first piece of information with the sender, using a statistical model;
    wherein the detecting of the intrusion in the bus system is based on the associating; and
    updating the statistical model based on data of the intrusion detection.

9. A device configured to evaluate a signal that is transferred and/or receivable via a bus system, the device configured to:
    receive the signal via a bus of the bus system;
    ascertain, using a measuring device, a first variable that characterizes a length of a bit sequence associated with the signal, the bit sequence including n bits, where n is greater than or equal to one, wherein the length of the bit sequence is a time duration of the bit sequence, wherein the measuring device includes at least one of the following elements: A) a time-to-digital converter, B) a hardware circuit, C) an application-specific integrated circuit (ASIC), D) an analog-to-digital converter; and ascertain a second variable that characterizes a deviation of the length of the bit sequence from a reference bit sequence that includes n bits, wherein the length of the reference bit sequence is a time duration of the reference bit sequence;

measure, using the measuring device, a time duration of a first time period between a rising edge of the bit sequence and a next, falling edge of the bit sequence following the rising edge, measure, using the measuring device, a time duration of a second time period between a first rising edge of the bit sequence and a next, rising edge of the bit sequence following the first rising edge, measure, using the measuring device, a time duration of a third time period between a falling edge of the bit sequence and a next, rising edge of the bit sequence following the falling edge, measure, using the measuring device, a time duration of a fourth time period between a first falling edge of the bit sequence and a second falling edge of the bit sequence following the first falling edge;

ascertain a first piece of information that characterizes a sender of the bit sequence based on the first variable and the second variable, wherein the first piece of information that characterizes the sender of the bit sequence is further based on the time duration of the first time period, the time duration of the second time period, the time duration of the third time period, and the time duration of the fourth time period, and wherein the first piece of information is a fingerprint characterizing the sender;

detect an intrusion on the bus system based on the first piece of information; and initiate a countermeasure based on the detecting of the intrusion.

10. A non-transitory computer-readable memory medium on which are stored commands for evaluating a signal that is transferred and/or received via a bus system, the commands, when executed by a computer, causing the computer to perform the following:

receiving the signal via a bus of the bus system;

ascertaining, using a measuring device, a first variable that characterizes a length of a bit sequence associated with the signal, the bit sequence including n bits, where n is greater than or equal to one, wherein the length of the bit sequence is a time duration of the bit sequence, wherein the measuring device includes at least one of the following elements: A) a time-to-digital converter, B) a hardware circuit, C) an application-specific integrated circuit (ASIC), D) an analog-to-digital converter;

ascertaining a second variable that characterizes a deviation of the length of the bit sequence from a length of a reference bit sequence that includes n bits, wherein the length of the reference bit sequence is a time duration of the reference bit sequence;

measuring, using the measuring device, a time duration of a first time period between a rising edge of the bit sequence and a next, falling edge of the bit sequence following the rising edge, measuring, using the measuring device, a time duration of a second time period between a first rising edge of the bit sequence and a next, rising edge of the bit sequence following the first rising edge, measuring, using the measuring device, a time duration of a third time period between a falling edge of the bit sequence and a next, rising edge of the bit sequence following the falling edge, measuring, using the measuring device, a time duration of a fourth time period between a first falling edge of the bit sequence and a second falling edge of the bit sequence following the first falling edge;

ascertaining a first piece of information that characterizes a sender of the bit sequence based on the first variable and the second variable, wherein the first piece of information that characterizes the sender of the bit sequence is further based on the time duration of the first time period, the time duration of the second time period, the time duration of the third time period, and the time duration of the fourth time period, and wherein the first piece of information is a fingerprint characterizing the sender;

detecting an intrusion on the bus system based on the first piece of information; and initiating a countermeasure based on the detecting of the intrusion.

* * * * *